United States Patent
Keller et al.

(10) Patent No.: US 6,887,577 B1
(45) Date of Patent: May 3, 2005

(54) COMPOUND SAFETY GLASS AND PVB FOIL FOR THE PRODUCTION THEREOF

(75) Inventors: Uwe Keller, Sankt Augustin (DE); Bernard Koll, Sankt Augustin (DE); Holger Stenzel, Hennef (DE)

(73) Assignee: HT Troplast AG, Troisdorf (DE)

( * ) Notice: Subject to any disclaimer, the term of this patent is extended or adjusted under 35 U.S.C. 154(b) by 0 days.

(21) Appl. No.: 10/049,850

(22) PCT Filed: Aug. 16, 2000

(86) PCT No.: PCT/DE00/02743

§ 371 (c)(1),
(2), (4) Date: Jun. 21, 2002

(87) PCT Pub. No.: WO01/19747

PCT Pub. Date: Mar. 22, 2001

(30) Foreign Application Priority Data

Aug. 16, 1999 (DE) .......................................... 199 38 159

(51) Int. Cl.$^7$ ......................... B32B 17/10; C03C 27/12; C08L 29/14
(52) U.S. Cl. ....................... 428/436; 428/437; 524/297; 524/306; 524/308; 524/314; 524/377; 524/378; 524/385; 524/386
(58) Field of Search ................................ 428/436, 437; 524/297, 306, 308, 314, 377, 378, 385, 386

(56) References Cited

U.S. PATENT DOCUMENTS 5,332,774 A    7/1994   Klang et al.

FOREIGN PATENT DOCUMENTS

| EP | 0041229 | 12/1981 |
| JP | 6115980 | 4/1994 |
| JP | 07097240 A | 4/1995 |

OTHER PUBLICATIONS

XP002158658 Abstract of JP 06115980 (Sekisui Chemical Co Ltd. Japan) Apr. 26, 1994.

Primary Examiner—D. S. Nakarani

(74) Attorney, Agent, or Firm—Millen, White, Zelano, Branigan, P.C.

(57) ABSTRACT

Known intermediate foils for compound glasses with improved sound insulation consist of several layers or special materials which cannot be further processed in conventional plants. The aim of the present invention is to provide an intermediate foil for compound glasses with improved sound insulation, whereby said foil consists of one layer as far as possible and is based upon PVB. Said intermediate foil allows for an improved sound insulation of the compound glasses in room temperature and has essentially unchanged working properties, whereby said compound glasses are produced from the intermediate foil. To resolve the aim of the invention, an intermediate foil is provided which contains: 50 to 80 wt. % PVB (partially acetalised polyvinyl alcohol), 20 to 50 wt. % of a softener mixture containing 30 to 70 wt. %, calculated as a portion of the softener mixture, of one or more polyalkylene glycoles of the group consisting of polyalkylene glykoles of the general formula HO—(R—O)n-H with R=alkylene and n>5, block copolymers made of ethylene- and propylene glycole of the general formula HO—(CH2-CH2-O)n-(CH2-CH(CH3)-O)m-H with n>2, m>3 and (n+m)<25, derivatives of block copolymers made of ethylene- and propylene glycole of the general formula R1O—(CH2-CH2-O)n-(CH2-CH(CH3)-O)m-H or HO—(CH2-CH2-O)n-(CH2-CH(CH3)-O)m-R1 with n>2, m>3 and (n+m)<25 and R1 as the organic radical, derivatives of polyalkylene glycols of the general formula R1-O—(R2-O)n-H with R2=alkylene and n>2, wherein the hydrogen of one of the two terminal hydroxy-groups of the polyalkylene glycol is replaced by an organic Rest R1, derivatives of polyalkylene glycols of the general formula R1-O—(R2-O)n-R3 with R2=alkylene and n>5, wherein the hydrogen of the two terminal hydroxygroups of the polyalkylene glycol is replaced by an organic Rest R1 or R3.

25 Claims, 1 Drawing Sheet

COMPOUND SAFETY GLASS AND PVB FOIL FOR THE PRODUCTION THEREOF

TECHNICAL FIELD

Figure 1:
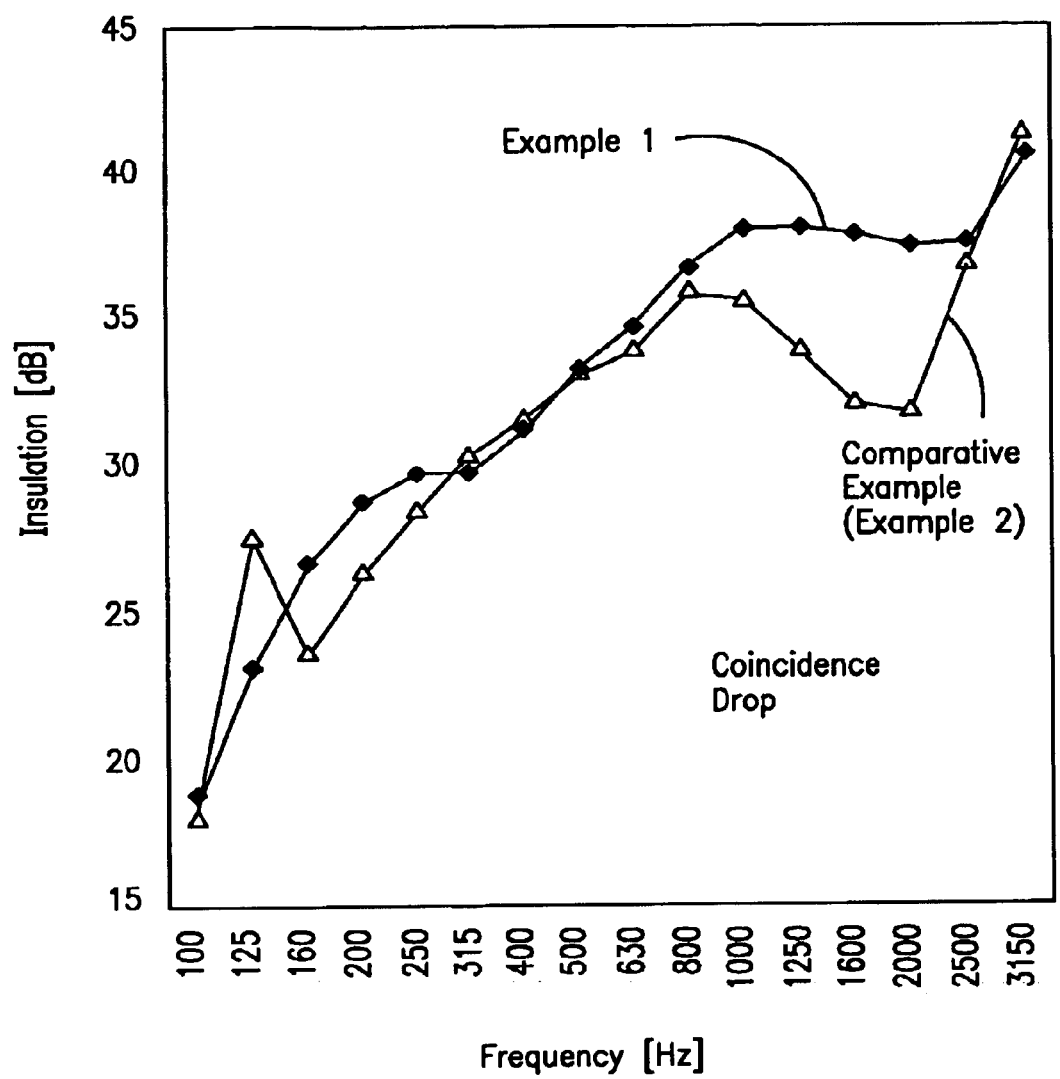

The invention relates to laminated safety glass with improved acoustic properties, and also to a PVB film for producing the same. Laminated safety glass is generally composed of two panes of glass and of an adhesive film bonding the panes. The vast majority of adhesive films used are films made from plasticized, partially acetalized polyvinyl alcohols, in particular from polyvinyl butyral (PVB). Examples of use of the abovementioned laminated safety glass are windscreens in the motor vehicle sector, and also glazing in the construction sector.

The plasticizers mainly used in industry for PVB are aliphatic diesters of tri- or tetraethylene glycol. These include 3GH, 3G7, 3G8, and also 4G7, where the prefixed figure indicates the number n in the repeat unit $H-(O-CH_2-CH_2)_n-OH$ of the oligoethylene glycol fraction and H indicates 2-ethylbutyrate, 7 indicates n-heptanoate and 8 indicates 2-ethylhexanoate. Examples of other known plasticizers for polyvinyl butyral are dialkyl adipates with aliphatic or, respectively, cycloaliphatic ester components, dialkyl sebacates, triorganophosphates, triorganophosphites and phthalate plasticizers, such as benzyl butyl phthalate.

Compared with monolithic panes of glass with the same overall thickness, laminated safety glass has higher sound insulation. This is attributable to the fact that the elasticity of the PVB film reduces the mechanical coupling between the individual panes, and thus hinders the transfer of vibration from the side of the pane facing the sound source to the opposite side of the pane.

The insulation efficiency of glazing can be determined as a function of the frequency to DIN 52210 or DIN EN ISO 717, and is expressed by the sound insulation value $R_w$, which is a weighted average over the frequency range from 100 to 3150 Hz relevant for the acoustics of buildings. A higher value $R_w$ here represents better sound insulation by the glazing. For example, a pane of conventional laminated glass with the structure 3 mm of glass/0.38 mm of PVB film/3 mm of glass can achieve a $R_w$ of 33 dB, whereas 32 dB is the value measured for a monolithic pane of thickness 6 mm.

However, the insulation performance of known laminated safety glass is inadequate for many applications. When the sound insulation provided by laminated safety glass of the prior art, with a conventional PVB film as intermediate layer, is measured at room temperature the insulation rises steadily and approximately linearly within a wide range with increasing frequency, but a marked drop in insulation (relative minimum in insulation, coincidence drop) can be seen in particular in the frequency range from about 1000 to 3500 Hz. The position of this coincidence drop depends on the thickness of the glasses used. If each of the panes used has a thickness of 4 mm the coincidence drop is approximately in the range from 1 250 to 2 500 Hz, and if thinner panes are used the insulation drop shifts to higher frequencies, while the range is shifted toward lower frequencies if thicker panes are used. The term coincidence frequency is used below for the frequency at which the insulation curve passes through the relative minimum in the range of the coincidence drop.

PRIOR ART

Proposals have previously been made for improving the sound insulation performance of laminated safety glass. U.S. Pat. No. 5,773,102 (=EP 0 763 420 A1) discloses laminated safety glass in which a specific acoustic film is used, besides a standard PVB film, to improve acoustic properties.

DE 197 05 586 C1 and EP 0 844 075 A1 likewise propose a thermoplastic intermediate layer itself having more than one layer, for a sound-insulating laminated pane of glass for motor vehicles. The laminate is composed of a viscoelastic acrylic polymer film, each side of which has been bonded via a polyethylene terephthalate film of from 0.01 to 0.1 mm thickness and a thermoplastic adhesive polyvinyl butyral film to two panes of silicate glass.

However, intermediate layers of this type which themselves have more than one layer involve complications in production, and frequently also in further processing.

Finally, DE 24 61 775 A1 discloses laminated safety glass in which, although the addition of very large amounts of standard plasticizer, in this case Flexol, achieves improved sound insulation, the amount of plasticizer used leads to increased tack, and the film therefore has limited capability for further processing using conventional systems.

OBJECT

It is therefore an object of the present invention to provide, for laminated glass, an intermediate film which if possible has one layer and which is based on PVB, and which can give the laminated glass produced from the same improved sound insulation at room temperature, without any substantial alteration in ease of processing. A further object of the invention is to provide laminated glass having an intermediate layer based on PVB and providing improved sound insulation at room temperature.

DESCRIPTION OF THE INVENTION

The invention achieves this object by means of laminated safety glass comprising
  a first and a second pane of glass, and also,
  arranged between the first and the second pane of glass, an intermediate layer, where the intermediate layer comprises:
  from 50 to 80% by weight of (PVB) partially acetalized polyvinyl alcohol
  from 20 to 50% by weight of a plasticizer mixture, comprising
  from 30 to 70% by weight—calculated as proportion of the plasticizer mixture—of one or more polyalkylene glycols selected from the group consisting of
  polyalkylene glycols of the general formula $HO-(R-O)_n-H$, where R=alkylene and n>5,
  block copolymers of ethylene glycol and propylene glycol having the general formula $HO-(CH_2-CH_2-O)_n-(CH_2-CH(CH_3)-O)_m-H$, where n>2, m>3, and (n+m)<25,
  derivatives of block copolymers of ethylene glycol and propylene glycol having the general formula $R_1O-$ $(CH_2-CH_2-O)_n-(CH_2-CH(CH_3)-O)_m-H$ or $HO-(CH_2-CH_2-O)_n-(CH_2-CH(CH_3)-O)_m-R_1$, where n>2, m>3, and (n+m)<25 and $R_1$ as organic radical, derivatives of polyalkylene glycols of the general formula $R_1-O-(R_2-O)_n-H$, where $R_2$=alkylene and n≧2, in which the hydrogen of one of the two terminal hydroxyl groups of the polyalkylene glycol has been replaced by an organic radical $R_1$, derivatives of polyalkylene glycols of the general formula $R_1-O-(R_2-O)_n-R_3$, where $R_2$=alkylene and n>5, in which the hydrogen of both terminal hydroxyl groups of the polyalkylene glycol has been replaced by an organic radical $R_1$ and, respectively, $R_3$.

This laminated safety glass is preferably combined with one or more of the following features:

The laminated safety glass is characterized in that the polyalkylene glycols have been selected from the group consisting of polyethylene glycol $HO-(CH_2-CH_2-O)_n-H$, where 8<n<25, block copolymers of ethylene glycol and propylene glycol having the general formula $HO-(CH_2-CH_2-O)_n-(CH_2-CH(CH_3)-O)_m-H$, where n>3, m>4, and (n+m)<20, derivatives of block copolymers of ethylene glycol and propylene glycol having the general formula $R_1O-(CH_2-CH_2-O)_n-(CH_2-CH(CH_3)-O)_m-H$ or $HO-(CH_2-CH_2-O)_n-(CH_2-CH(CH_3)-O)_m-R_1$, where n>3, m>4, and (n+m)<20 and $R_1$ as organic radical, polybutylene glycol $HO-(CH_2-CH_2-CH_2-CH_2-O)_n-H$, where 4<n<18, derivatives of the polyethylene glycol of the general formula $R_1-O-(CH_2-CH_2-O)_n-H$, where n>2 and $R_1$ is an organic radical, derivatives of the polybutylene glycol of the general formula $R_1-O-(CH_2-CH_2-CH_2-CH_2-O)_n-H$, where n≧2 and $R_1$ is an organic radical;

The laminated safety class is characterized in that the proportion of the polyalkylene glycols in the total mixture for the intermediate layer is greater than 10% by weight and less than 25% by weight;

The laminated safety glass is characterized in that at least one plasticizer selected from the group consisting of esters of polybasic aliphatic or aromatic acids, polyhydric aliphatic or aromatic alcohols or oligoether glycols having not more than four ether units with one or more unbranched or branched aliphatic or aromatic substituents, e.g. dialkyl adipate, dialkyl sebacate, esters of di-, tri- or tetraglycols with linear or branched aliphatic carboxylic acids is used as further plasticizer in the plasticizer mixture;

The laminated safety glass is characterized in that at least one plasticizer selected from the group consisting of di-n-hexyl adipate (DHA) and triethylene glycol bis-n-heptanoate (3G7) is used as further plasticizer at a proportion >10% by weight of the total mixture; and The laminated safety lass is characterized in that a polyvinyl butyral having from 19 to 22% by weight of vinyl alcohol radical and from 0.5 to 2.5% by weight of acetate radical is used as resin.

The object is also achieved by means of a sound insulating film comprising:

from 50 to 80% by weight of partially acetalized polyvinyl alcohol, from 20 to 50% by weight of a plasticizer mixture, comprising from 30 to 70% by weight—calculated as proportion of the plasticizer mixture—of one or more polyalkylene glycols selected from the group consisting of polyalkylene glycols of the general formula $HO-(R-O)_n-H$, where R=alkylene and n>5, block copolymers of ethylene glycol and propylene glycol having the general formula $HO-(CH_2-CH_2-O)_n-(CH_2-CH(CH_3)-O)_m-H$, where n>2, m>3, and (n+m)<25, derivatives of block copolymers of ethylene glycol and propylene glycol having the general formula $R_1O-(CH_2-CH_2-O)_n-(CH_2-CH(CH_3)-O)_m-H$ or $HO-(CH_2-CH_2-O)_n-(CH_2-CH(CH_3)-O)_m-R_1$, where n>2, m>3, and (n+m)<25 and $R_1$ as organic radical, derivatives of polyalkylene glycols of the general formula $R_1-O-(R_2-O)_n-H$, where $R_2$=alkylene and n≧2, in which the hydrogen of one of the two terminal hydroxyl groups of the polyalkylene glycol has been replaced by an organic radical $R_1$, derivatives of polyalkylene glycols of the general formula $R_1-O-(R_2-O)_n-R_3$, where $R_2$=alkylene and n>5, in which the hydrogen of both terminal hydroxyl groups of the polyalkylene glycol has been replaced by an organic radical $R_1$ and, respectively, $R_3$.

The invention also relates to the use of one or more polyalkylene glycols selected from the group consisting of polyalkylene glycols of the general formula $HO-(R-O)_n-H$, where R=alkylene and n>5, block copolymers of ethylene glycol and propylene glycol having the general formula $HO-(CH_2-CH_2-O)_n-(CH_2-CH(CH_3)-O)_m-H$, where n>2, m>3, and (n+m)<25, derivatives of block copolymers of ethylene glycol and propylene glycol having the general formula $R_1O-(CH_2-CH_2-O)_n-(CH_2-CH(CH_3)-O)_m-H$ or $HO-(CH_2-CH_2-O)_n-(CH_2-CH(CH_3)-O)_m-R_1$, where n>2, m>3, and (n+m)<25 and $R_1$ as organic radical, derivatives of polyalkylene glycols of the general formula $R_1-O-(R_2-O)_n-H$, where $R_2$=alkylene and n>2, in which the hydrogen of one of the two terminal hydroxyl groups of the polyalkylene glycol has been replaced by an organic radical $R_1$, derivatives of polyalkylene glycols of the general formula $R_1-O-(R)-O)_n-R_3$, where $R_2$=alkylene and n>5, in which the hydrogen of both terminal hydroxyl groups of the polyalkylene glycol has been replaced by an organic radical $R_1$ and, respectively, $R_3$, as an additive improving sound insulation in films produced from plasticized partially acetalized polyvinyl alcohol resin and having a water content of from 0.15 to 0.8% by weight for laminated safety glass, where the sound insulation of the laminated safety glass is increased by the addition of the polyalkylene glycols by at least 2 dB, measured to DIN EN ISO 717, in the coincidence frequency region from 1000 to 3500 Hz.

At the heart of the present invention is the use of a polyalkylene glycol of the formula $HO-(R-O)_n-H$ or derivatives of the same as a plasticizer, in addition to at least one first plasticizer known per se, in a PVB film.

Compared with conventional plasticizers, polyalkylene glycol or derivatives of the same used as coplasticizer in a PVB film bring about a marked improvement in sound insulation in laminated glass produced with a film of this type. In particular, the otherwise pronounced fall-off of sound insulation in the coincidence region is significantly less pronounced. Compared with a standard film composition, the proportion of polyvinyl butyral and/or of the standard plasticizer used in each case in the PVB film can be reduced and replaced by a polyalkylene glycol or a derivative of the same. The general embodiment of the invention is characterized by the fact that the polyalkylene glycol or, respectively, a derivative of the same, mixed with one or more conventional plasticizers, plasticizes the PVB resin.

In the general embodiment of the invention the total of the plasticizing components (polyalkylene glycol+conventional plasticizer) makes up from 20 to 50% by weight of the film. In its preferred embodiment the total plasticizer content is from 25 to 40% by weight and in the most preferred embodiment is from 30 to 35% by weight. The proportion of the polyalkylene glycol of the invention in the film here amounts to more than 5% by weight in the preferred case and to more than 10% by weight in the most preferred case, in each case based on the total composition of the film.

For the purposes of the invention, polyalkylene glycols are those which have an average degree of polymerization DP of 6 or higher, but where this degree is not so high that combination with the other components of the film gives unacceptable haze in the laminated glass. Haze values which should be regarded as unacceptable when measured to ASTM D1003-6 are those above 3% haze or, respectively, $\Delta L$ deviations between greater than 3 found in comparative measurements of the duplex glass laminated with PVB film and duplex glass with no PVB film and taking $L_{(laminate)} - L_{(duplex\ glass)} = \Delta L$ in accordance with DIN 5033. The haze values are preferably below 1.5%, in particular below 1% haze for a film thickness of 0.76 mm.

For the purposes of the invention, the specific polyalkylene glycols may be poly(ethylene oxides), including block copolymers of the type HO—$(CH_2$—$CH_2$—$O)_n$—$(CH_2$—$CH(CH_3)$—$O)_m$—H, poly(propylene oxides) or poly (butylene oxides), or else derivatives of the same, but poly(propylene oxides) are not preferred, since their effectiveness is low. The non-derivatized polyalkylene glycols of the invention should have an average degree of polymerization—referred to below as DP—of at least 6. Examples here are Pluriol® E 600 from BASF with an average degree of polymerization DP of 13.6 and Pluriol® P 2000 from BASF with an average degree of polymerization DP of 15.5.

For the purposes of the invention, derivatives of polyalkylene glycols are those in which the hydrogen of at least one of the two terminal hydroxyl groups of the polyalkylene glycol has been replaced by an organic radical. Possible examples here are ethoxylated fatty alcohols, ethoxylated fatty acids, such as the polyethylene glycol ester of oleic acid, or monoethers of polyalkylene glycol with monohydric aliphatic alcohols, such as methanol or ethanol. Other examples are Marlophen® NP 6 from Condea, whose structure has a polyethylene glycol fraction with a DP of 6 and an isononylphenol fraction on one of the two hydroxyl-terminated ends, and also Marlipal® O 13/100 from Condea, whose structure has a polyethylene glycol fraction with a DP of 10 and a $C_{13}$ oxo alcohol. In these monoderivatives of polyalkylene glycols, the DP of the polyalkylene glycol fraction must be at least 2. The upper DP limit is given by the compatibility with the other components of the film.

If the hydrogen of two terminal hydroxyl groups of the polyalkylene glycol fraction has been replaced by an organic radical, the polyalkylene glycol fraction must have a DP of at least 6. An example here is PEG-400 di(2-ethylhexanoate), a poly(ethylene glycol) di(2-ethylhexanoate), whose poly(ethylene glycol) fraction has an average molecular weight of 400 [g/mol].

The resins used in the novel film are partially acetalized polyvinyl alcohols known per se, in particular polyvinyl butyral. The partially acetalized polyvinyl alcohols are prepared in a known manner by acetalizing hydrolyzed polyvinyl esters. Examples of aldehydes which may be used are formaldehyde, acetaldehyde, propionaldehyde, butyraldehyde and the like, preferably butyraldehyde. The preferred polyvinyl butyral resin contains from 10 to 25% by weight, preferably from 17 to 23% by weight and particularly preferably from 19 to 22% by weight, of vinyl alcohol radicals. The polyvinyl butyral may also, if desired, contain from 0 to 20% by weight, preferably from 0.5 to 2.5% by weight, of acetate radicals. Wherever the term polyvinyl butyral or PVB is used in this application it generally also includes the other partially acetalized polyvinyl alcohols.

Besides the above-described polyalkylene glycols according to the invention, at least one further plasticizer is used. This is preferably a standard plasticizer selected from the group consisting of esters of polybasic aliphatic or aromatic acids, e.g. dialkyl adipates such as dihexyl adipate, dioctyl adipate, hexyl cyclohexyl adipate, mixtures of hepty and nonyl adipates, diisononyl adipate, heptyl nonyl adipate, and also esters of adipic acid with cycloaliphatic ester alcohols, dialkyl sebacates such as dibutyl sebacate, and phthalates such as butyl benzyl phthalate;

esters of polyhydric aliphatic or aromatic alcohols or oligoether glycols having not more than four ethylene glycol units with one or more unbranched or branched aliphatic or aromatic substituents, e.g. esters of di-, tri- or tetraglycols with linear or branched aliphatic or cycloaliphatic carboxylic acids; Diethylene glycol bis (2-ethylhexanoate), triethylene glycol bis(2-ethylhexanoate), triethylene glycol bis(2-ethylbutanoate), tetraethylene glycol bis-n-heptanoate, triethylene glycol bis-n-heptanoate, and triethylene glycol bis-n-hexanoate can serve as examples of the latter group.

Particularly preferred standard plasticizers are di-n-hexyl adipate (DHA) and triethylene glycol bis-n-heptanoate (3G7).

To produce the novel PVB film with improved sound insulation, the liquid, paste or solid polyalkylene glycol component is mixed with the standard plasticizer, giving either a homogeneous solution of the polyalkylene glycol component in the plasticizer or, if the polyalkylene glycol component and plasticizer are incompatible, a dispersion. The mixture made from plasticizer and polyalkylene glycol component is then processed together with the pulverulent polyvinyl butyral, while supplying heat and mechanical work, to give a homogeneous film mass, and this material is preferably extruded through a flat-film die to give a web of film. Further constituents which may, if desired, be present in the film are dyes, light stabilizers, stabilizers, processing aids, water, and also adhesion regulators.

The water content of the films is preferably set at from 0.15 to 0.8% by weight, in particular from 0.4 to 0.7% by weight.

Besides the improved insulation properties, the novel laminated safety glass (LSG) has the properties featured by LSG, such as resistance to breakage, splinter retention and transparency. For example, adhesion tests on the glass using a pummel test give values of 8–10 for the fire side and 7 for the tin side of the glass.

METHODS OF WORKING THE INVENTION, AND ALSO COMPARATIVE EXAMPLE

Example 1

22 parts by weight of triethylene glycol bis-n-heptanoate (3G7) as standard plasticizer, together with 11 parts by weight of Pluriol® 600, an unsubstituted poly(ethylene glycol) with an average molar mass of 600 [g/mol] or an average degree of polymerization DP of 13.6, and also 0.15 part by weight of Tinuvin® P UV absorber (manufacturer: Ciba) were added to 67 parts by weight of a polyvinyl butyral resin with a vinyl alcohol radical content (OH group content calculated as vinyl alcohol content) of 20.5% by weight and a vinyl acetate radical content of 0.7% by weight. The mixture was extruded at a melt temperature of about 200° C. in a twin-screw extruder with a flat-film die to give a transparent film of thickness 0.76 mm.

The PVB film and each of two panes of glass of dimensions 1480×1230×4 mm then underwent a lamination process, by simultaneous heating and compression in an autoclave, to give panes of laminated glass. The sound insulation value $R_w$ of these panes was determined to DIN EN ISO 717 across the frequency band from 50 Hz to 5000 Hz at frequency intervals of one third of an octave. The temperature of the test specimen and of the test room was 21° C. Results of these measurements are shown in diagram 1 in the form of an insulation curve, in which higher values measured at a particular frequency signify better insulation.

Comparative Example (Example 2)

The insulation curve, shown for comparison in diagram 1, of laminated glass with the structure 4 mm of glass/0.76 mm of standard PVB/4 mm of glass, with 26% by weight of 3G7 as plasticizer, shows a clear drop in insulation between 1000 and 2000 Hz. This phenomenon is known as coincidence drop and represents a characteristic weakness—with respect to sound exclusion—of laminated glass produced with standard PVB.

The relative minimum in the sound insulation in the coincidence region is at about 1900 Hz, i.e. the coincidence frequency is 1900 Hz. At this frequency the insulation, at about 31.5 dB, is more than 5 dB below the corresponding value for the film according to example 1.

Examples 3 to 7

The examples 3 to 7 given in the table below were carried out as for example 1. The sound insulation curves for these examples 3 to 7 were at a level similar to the curve according to example 1.

| Example/constituent | 1 | 2 (comparative) | 3 | 4 | 5 | 6 | 7 |
|---|---|---|---|---|---|---|---|
| Polyvinyl butyral | 67 | 74 | 67 | 67 | 67 | 67 | 67 |
| DHA[1] | — | — | — | 22 | — | 22 | 22 |
| 3G7[2] | 22 | 26 | 22 | — | 16.5 | — | — |
| Pluriol® 600[3] | 11 | — | — | 11 | — | — | — |
| Marlophen® NP 12[4] | — | — | 11 | — | 16.5 | — | — |
| Marlophen® NP 6[5] | — | — | — | — | — | — | 11 |
| Poly-THF 650[6] | — | — | — | — | — | 11 | — |
| UV absorber | 0.15 | 0.15 | 0.15 | 0.15 | 0.15 | 0.15 | 0.15 |
| Property | | | | | | | |
| Film thickness [mm] | 0.76 | 0.76 | 0.76 | 0.76 | 0.76 | 0.76 | 0.76 |
| Haze ΔL | −0.32 | | | | 0.01 | 0.26 | −0.16 |
| $R_w$[7] | 37.0 | 35.4 | 36.4 | 37.3 | 36.1 | 36.2 | 36.9 |

[1]Di-n-hexyl adipate
[2]Triethylene glycol bis-n-heptanoate
[3]Poly(ethylene glycol) with an average molecular weight of 600 [g/mol]
[4]Monolaterally substituted PEG with a polyethylene glycol fraction with a DP of 12 and an isononylphenol fraction on one of the two hydroxyl-terminated ends.
[5]Bilaterally substituted PEG with a polyethylene glycol fraction with a DP of 6 and an isononylphenol fraction on one of the two hydroxyl-terminated ends.
[6]Polybutylene glycol with a DP of about 9 from BASF.
[7]Sound insulation value in dB measured to DIN EN ISO 717.

For all of the films of the examples the haze values found for the laminated glass were low and comparable with those for laminated glass laminated using a PVB film plasticized in a manner known per se. Despite the increased total plasticizer content, 33% by weight compared with 26% by weight in comparative example 2, there was no significant impairment of the handling properties of the film, in particular its tack. In comparison with this, a film with 33% by weight of 3G7 content would have a limited capability for further processing using conventional systems, due to high tack—as a result of plasticizer exudation.

What is claimed is:

1. A laminated safety glass, comprising;
   a first and a second pane of glass; and
   arranged between the first and the second pane of glass, an intermediate layer comprising:
   from 50 to 80% by weight of partially acetalized polyvinyl alcohol, and
   from 20 to 50% by weight of a plasticizer mixture comprising a first plasticizer and one or more polyalkylene glycols, wherein from 30 to 70% by weight of said plasticizer mixture is said one or more polyalkylene glycols, and said one or more polyalkylene glycols are selected from:
   polyalkylene glycols of the general formula HO—(R—O)$_n$—H, wherein R is alkylene and n>5;
   block copolymers of ethylene glycol and propylene glycol of the formula HO—(CH$_2$—CH$_2$—O)$_n$—(CH$_2$—CH(CH$_3$)—O)$_m$—H, wherein n>2, m>3, and (n+m)<25;
   derivatives of block copolymers of ethylene glycol and propylene glycol of the formula R$_1$O—

$(CH_2-CH_2-O)_n-(CH_2-CH(CH_3)-O)_m-H$
or $HO-(CH_2-CH_2-O)_n-(CH_2-CH(CH_3)-O)_m-R_1$, wherein n>2, m>3, and (n+m)<25 and $R_1$ is an organic radical;

derivatives of polyalkylene glycols of the formula $R_1-O-(R_2-O)_n-H$, wherein $R_2$ is alkylene and n≧2, and $R_1$ is an organic radical; and derivatives of polyalkylene glycols of the formula $R_1-O-(R_2-O)_n-R_3$, where $R_2$ is alkylene and n>5, ands $R_1$ and $R_3$ are each an organic radical.

2. A laminated safety glass according to claim 1, wherein said one or more polyalkylene glycols are selected from:

polyethylene glycol of the formula $HO-(CH_2-CH_2-O)_n-H$, wherein 8<n<25;

block copolymers of ethylene glycol and propylene glycol of the formula $HO-(CH_2-CH_2-O)_n-(CH_2-CH(CH_3)-O)_m-H$, wherein n>3, m>4, and (n+m)<20;

derivatives of block copolymers of ethylene glycol and propylene glycol of the formula $R_2O-(CH_2-CH_2-O)_n-(CH_2-CH(CH_3)-O)_m-H$ or of the formula $HO-(CH_2-CH_2-O)_n-(CH_2-CH(CH_3)-O)_m-R_1$, wherein n>3, m>4, and (n+m)<20 and $R_1$ is an organic radical;

polybutylene glycol of the formula $HO-(CH_2-CH_2-CH_2-CH_2-O)_n-H$, wherein 5<n<18; and derivatives of the polyethylene glycol of the formula $R_1-O-(CH_2-CH_2-O)_n-H$, wherein n≧2 and $R_1$ is an organic radical.

3. A laminated safety glass according to claim 2, wherein the proportion of the polyalkylene glycols in the intermediate layer is greater than 10% by weight and less than 25% by weight.

4. A laminated safety glass according to claim 3, wherein said first plasticizer is at least one plasticizer selected from esters of polybasic aliphatic or aromatic acids, and polyhydric aliphatic or aromatic alcohols or oligoether glycols having not more than four ether units with one or more unbranched or branched aliphatic or aromatic substituents.

5. A laminated safety glass according to claim 2, wherein said first plasticizer is at least one plasticizer selected from esters of polybasic aliphatic or aromatic acids, and polyhydric aliphatic or aromatic alcohols or oligoether glycols having not more than four ether units with one or more unbranched or branched aliphatic or aromatic substituents.

6. A laminated safety glass according to any of claim 2, wherein said partially acetalized polyvinyl alcohol is polyvinyl butyral having from 19 to 22% by weight of vinyl alcohol radical and from 0.5 to 2.5% by weight of acetate radical.

7. A laminated safety glass according to claim 1, wherein the proportion of polyalkylene glycols in the intermediate layer is greater than 10% by weight and less than 25% by weight.

8. A laminated safety glass according to any of claim 7, wherein said partially acetalized polyvinyl alcohol is polyvinyl butyral having from 19 to 22% by weight of vinyl alcohol radical and from 0.5 to 2.5% by weight of acetate radical.

9. A laminated safety glass according to claim 1, wherein said first plasticizer is at least one plasticizer selected from esters of polybasic aliphatic or aromatic acids, and polyhydric aliphatic or aromatic alcohols or oligoether glycols having not more than four ether units with one or more unbranched or branched aliphatic or aromatic substituents.

10. A laminated safety glass according to claim 9, wherein said first plasticizer is at least one plasticizer selected from di-n-hexyl adipate and triethylene glycol bis-n-heptanoate, in each case being used at a proportion >10% by weight of the total mixture.

11. A laminated safety glass according to any of claim 10, wherein said partially acetalized polyvinyl alcohol is polyvinyl butyral having from 19 to 22% by weight of vinyl alcohol radical and from 0.5 to 2.5% by weight of acetate radical.

12. A laminated safety glass according to any of claim 9, wherein said partially acetalized polyvinyl alcohol is polyvinyl butyral having from 19 to 22% by weight of vinyl alcohol radical and from 0.5 to 2.5% by weight of acetate radical.

13. A laminated safety glass according to claim 9, wherein said first plasticizer is selected from dialkyladipates, dialkylsebacates, and esters of di, tri or tetra glycols with linear or branched aliphatic carboxylic acids.

14. A laminated safety glass according to claim 9, wherein said first plasticizer is dihexy adipate, dioctyl adipate, hexyl cyclohexyl adipate, a mixture of heptyl and nonyl adipates, diisononly adipate, heptyl nonyl adipate, dibutyl sebacate, butyl benzyl phthalate, diethylen glycol bis(2-ethylhexanoate), triethylene glycol bis(2-ethylhexanoate), triethylene glycol bis (2-ethylbutanoate), tetraethylene glycol bis-n-heptanoate, triethylene glycol bis-n-heptanoate, or triethylene glycol bis-n-hexanoate.

15. A laminated safety glass according to claim 1, wherein said partially acetalized polyvinyl alcohol is polyvinyl butyral having from 19 to 22% by weight of vinyl alcohol radical and from 0.5 to 2.5% by weight of acetate radical.

16. A laminated safety glass according to any of claim 1, wherein said partially acetalized polyvinyl alcohol is polyvinyl butyral having from 10 to 25% by weight of vinyl alcohol radical and from 0 to 20% by weight of acetate radical.

17. A laminated safety glass according to claim 1, wherein the water content of the intermediate layer is 0.15 to 0.8% by weight.

18. A laminated safety glass according to claim 1, wherein the water content of the intermediate layer is 0.4 to 0.7% by weight.

19. A sound-insulation film for producing laminated safety glass, comprising:

from 50 to 80% by weight of partially acetalized polyvinyl alcohol, and from 20 to 50% by weight of a plasticizer mixture comprising a first plasticizer and one or more polyalkylene glycols, wherein from 30 to 70% by weight of said plasticizer mixture is said one or more polyalkylene glycols, and said one or more polyalkylene glycols are selected from:

polyalkylene glycols of the general formula $HO-(R-O)_n-H$, wherein R is alkylene and n>5;

block copolymers of ethylene glycol and propylene glycol of the formula $HO-(CH_2-CH_2-O)_n-(CH_2-CH(CH_3)-O)_m-H$, wherein n>2, m>3, and (n+m)<25;

derivatives of block copolymers of ethylene glycol and propylene glycol of the formula $R_1O-(CH_2-CH_2-O)_n-(CH_2-CH(CH_3)-O)_m-H$ or $HO-(CH_2-CH_2-O)_n-(CH_2-CH(CH_3)-O)_m-R_1$, wherein n>2, m>3, and (n+m)<25 and $R_1$ is an organic radical;

derivatives of polyalkylene glycols of the formula $R_1$—O—$(R_2$—O$)_n$—H, wherein $R_2$ is alkylene and n≧2, and $R_1$ is an organic radical; and derivatives of polyalkylene glycols of the formula $R_1$—O—$(R_2$—O$)_n$—$R_3$, where $R_2$ is alkylene and n>5, ands $R_1$ and $R_3$ are each an organic radical.

20. A sound installation film according to claim 19, wherein the plasticizer content of said film is 25–40% by weight and the proportion of the polyalkylene glycol plasticizer is more than 5% by weight.

21. A film according to claim 19, wherein the water content of the intermediate film is 0.15 to 0.8% by weight.

22. A film according to claim 19, wherein the water content of the intermediate film is 0.4 to 0.7% by weight.

23. A process for improving sound insulation in laminated safety glass containing a film of plasticized partially acetalized polyvinyl alcohol resin, said process comprising adding to said resin at least one polyalkylene glycol whereby sound insulation is increased by at least 2 dB, measured according to DIN EN ISO 717, in the coincidence frequency region from 1000 to 3500 Hz, wherein said at least one polyalkylene glycol is selected from:

polyalkylene glycols of the formula HO—(R—O$)_n$—H, wherein R is alkylene and n>5:

block copolymers of ethylene glycol and propylene glycol of the formula HO—$(CH_2$—$CH_2$—O$)_n$—$(CH_2$—CH$(CH_3)$—O$)_m$—H, where n>2, m>3, and (n+m)<25;

derivatives of block copolymers of ethylene glycol and propylene glycol of the formula $R_1$O—$(CH_2$—$CH_2$—O$)_n$—$(CH_2$—CH$(CH_3)$—O$)_m$—H or HO—$(CH_2$—$CH_2$—O$)_n$—$(CH_2$—CH$(CH_3)$—O$)_m$—$R_1$, wherein n>2, m>3, and (n+m)<25 and $R_1$ is an organic radical;

derivatives of polyalkylene glycols of the formula $R_1$—O—$(R_2$—O$)_n$—H, wherein $R_2$ is alkylene and n≧2, and $R_1$ is an organic radical; and derivatives of polyalkyle glycols of the formula $R_1$—O—$(R_2$—O$)_n$—$R_3$, where $R_2$ is alkylene and n>5, ands $R_1$ and $R_3$ are each an organic radical.

24. A process according to claim 23, wherein the water content of the film is 0.15 to 0.8% by weight.

25. A process according to claim 23, wherein the water content of the film is 0.4 to 0.7% by weight.

* * * * *

UNITED STATES PATENT AND TRADEMARK OFFICE
CERTIFICATE OF CORRECTION

PATENT NO. : 6,887,577 B1
DATED : May 3, 2005
INVENTOR(S) : Uwe Keller et al.

It is certified that error appears in the above-identified patent and that said Letters Patent is hereby corrected as shown below:

Column 9,
Line 10, delete "ands" and insert -- and --
Lines 45 and 54, delete "any of"

Column 10,
Lines 6 and 11, delete "any of"
Line 34, delete "any of]"

Column 11,
Line 8, delete "ands" and insert -- and --
Line 9, delete "installation" and insert -- insulation --

Column 12,
Line 14, delete "polyalkyle" and insert -- polyalkylene --
Line 14, delete "ands" and insert -- and --

Signed and Sealed this

Ninth Day of August, 2005

JON W. DUDAS
*Director of the United States Patent and Trademark Office*